(Model.)

J. O. KELLER.
DENTAL ENGINE HAND PIECE.

No. 462,409. Patented Nov. 3, 1891.

Witnesses.

Inventor.
Josiah O. Keller
W. P. Denny
Attorney

UNITED STATES PATENT OFFICE.

JOSIAH O. KELLER, OF FORT WAYNE, INDIANA.

DENTAL-ENGINE HAND-PIECE.

SPECIFICATION forming part of Letters Patent No. 462,409, dated November 3, 1891.

Application filed December 20, 1890. Serial No. 375,530. (Model.)

*To all whom it may concern:*

Be it known that I, JOSIAH O. KELLER, a citizen of the United States, residing at Fort Wayne, in the county of Allen and State of Indiana, have invented certain new and useful Improvements in Dental-Engine Hand-Pieces; and I do hereby declare that the following is a full, clear, and exact description of the invention, which will enable others skilled in the art to which it appertains to make and use the same, reference being had to the accompanying drawings, which form part of this specification.

My invention relates to improvements in dental-engine hand-pieces.

The object of my improvement is to provide simple, strong, and durable means of adjusting the tool-clamping jaws of the chucking-rod with greater ease, readiness, and convenience by the operator. This object is secured by the mechanism illustrated in the accompanying drawings, in which—

Figure 1:
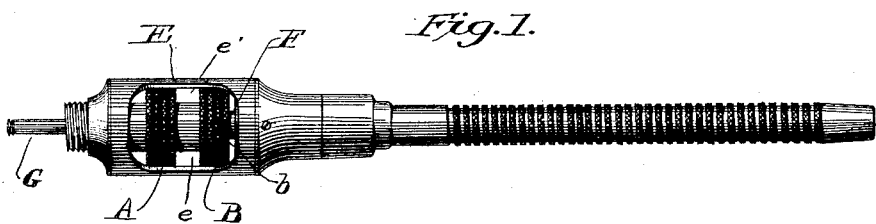
Figure 2:
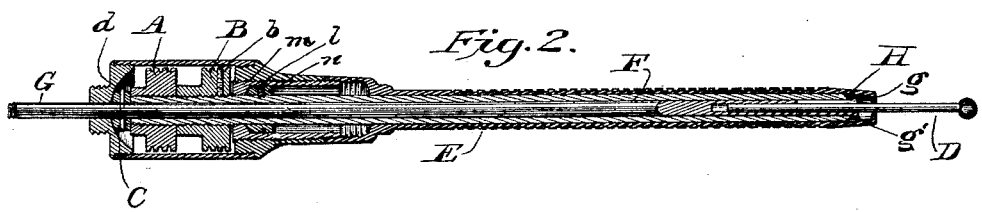

Figure 1 is a view of my improved hand-piece, showing finger-openings and adjusting-nuts. Fig. 2 is a longitudinal central section of the same, inclosing the tool-holding chuck with operating-tool in position.

Similar letters refer to similar parts in both views.

In Fig. 1 the outer casing E, constructed in a well-known manner, is provided with suitable finger-openings e and e' upon opposite sides of the casing E, that the operator may readily grasp and manipulate the nuts A and B. The nut B is rigidly fixed upon the rotating sleeve F, constructed in a well-known manner, by means of the set-screw b, which may also be made to pass through the sleeve F and center on the tool-holding chuck G, this causing the sleeve F to rotate with the spindle G, though I prefer the construction shown in Fig. 2.

In Fig. 2 the outer casing E incloses and joins by a threaded connection a short sleeve m. Within this sleeve m a fixed collar n, secured to the rotating sleeve F by a set-screw l, forms with the sleeve m a rear cone-bearing for the rotating sleeve F, a forward cone-bearing being provided for sleeve F at H in any proper manner. The internally double-threaded nut A, which rotates within the outer casing E, turns upon the double-threaded rear end of the rotating sleeve F and operates as a chuck-adjusting nut. The rigid nut or collar B, secured to the sleeve F and by a set-screw b, rotates within the casing E and affords a means of securing the sleeve F while the nut A is being adjusted by the operator. The tool-holding chuck or spindle G, independently movable longitudinally with adjustable or flexible jaws g g', made in the usual manner, is provided with a fixed collar C, against which the screw-nut A presses in the act of withdrawing the chucking-jaws and grasping the shank of the operating-tool D. The fixed nut C is secured to the spindle G by a set-screw d. When the set-screw b of rigid nut B does not pass through sleeve F, but is made as seen in Fig. 2, the sleeve F will still rotate with the spindle G, on account of the friction caused by the pressure of adjusting-nut A against the rigid nut C and the friction of the forward end of the sleeve F pressing the chuck-jaws g g' when the operating-tool D is inserted and properly adjusted therein.

In the operation of securing a tool in the hand-piece the nut B, which is rigidly secured to sleeve F, is held by the operator with one hand while the screw-nut A is turned by the other hand. Turning nut A forwardly extends the projecting chuck or spindle and prepares the jaws g for the reception of the operating-tool, while turning nut A rearwardly when in contact with or pressing against collar C, withdraws the chucking-rod or spindle horizontally back into the sleeve F, causing the inclined jaws g of the chuck to firmly grasp and securely hold the tool while being rotated, the rotating sleeve being held in place by its rear and forward bearings at m and n.

By having the chuck-adjusting nut A on the sleeve instead of on the chuck-spindle, several advantages are secured, viz: First, increasing the diameter of the chuck-adjusting nut sufficiently to turn on the rotating sleeve allows said nut to be double, triple, or multiple threaded, which is impracticable when the said nut turns on the chuck-spindle; second, by operating the chuck-adjusting nut upon the threaded sleeve instead of upon the chuck-spindle, the operator can adjust and remove his operating-tool with greater ease and readiness, for fewer revolutions of the nut are thus required to extend or withdraw the chuck-jaws; third, by this method of controlling and adjusting the chuck no sliding shield for closing the finger-openings of the outer casing is needed, which simplifies the construction, increases the convenience, and lessens the expense of a hand-piece. The double-threaded nut A may be either single, double, triple, or multiple threaded, though I prefer to make it double-threaded for the reasons before stated.

I am aware that prior to my invention hand-pieces having a rotating sleeve and threaded nuts on the chucking-rod or spindle for the adjustment of the chuck-jaws have long been in use, and I therefore do not intend to include these features, broadly, in my claims; but no hand-piece has ever been used of which I am aware in which the chuck and chuck-jaws are adjusted and controlled by a threaded screw-nut on the rotating sleeve in the manner above pointed out and described.

What I claim as my invention, and desire to secure by Letters Patent, is—

1. The combination, in a dental hand-piece, of the outer casing, the screw-threaded rotating sleeve, the double-threaded adjusting-nut A, the fixed nut B, the fixed collar C, and the chucking-rod G, carrying the tapering jaws $g$ $g'$, all substantially as described, and for the purposes set forth.

2. In a dental hand-piece, the combination of the outer casing E, having finger-openings $e$ and $e'$, with the threaded rotating sleeve F, having cone-bearings at $m$ and H, the fixed nut B, the fixed collar C upon the chucking-rod, the internally-threaded adjusting-nut A upon the rotating sleeve for withdrawing or extending the jaws $g$ and $g'$, and the chucking-rod G, having tapering jaws $g$ and $g'$, all substantially as described and hereinbefore set forth.

Signed by me this 8th day of November, 1890.

J. O. KELLER.

Witnesses:
  I. M. CHORPENING,
  R. E. SCARLET.